(12) United States Patent
Pourdeyhimi et al.

(10) Patent No.: US 9,284,663 B2
(45) Date of Patent: Mar. 15, 2016

(54) ARTICLES CONTAINING WOVEN OR NON-WOVEN ULTRA-HIGH SURFACE AREA MACRO POLYMERIC FIBERS

(71) Applicant: Allasso Industries, Inc., Raleigh, NC (US)

(72) Inventors: Behnam Pourdeyhimi, Cary, NC (US); Walter Chappas, Raleigh, NC (US); Harry M. Barnes, III, Montgomery, AL (US)

(73) Assignees: Allasso Industries, Inc., Raleigh, NC (US); North Carolina State University, Raleigh, NC (US)

( * ) Notice: Subject to any disclaimer, the term of this patent is extended or adjusted under 35 U.S.C. 154(b) by 253 days.

(21) Appl. No.: 13/746,887

(22) Filed: Jan. 22, 2013

(65) Prior Publication Data

US 2013/0133980 A1    May 30, 2013

(51) Int. Cl.
*D01F 6/00*     (2006.01)
*D04H 13/00*    (2006.01)
(Continued)

(52) U.S. Cl.
CPC ................ *D01F 6/00* (2013.01); *C01G 43/003* (2013.01); *D01D 5/253* (2013.01); *D01D 5/34* (2013.01); *D01F 8/10* (2013.01); *D01F 8/12* (2013.01); *D01F 8/14* (2013.01); *D04H 1/4382* (2013.01); *D04H 1/4391* (2013.01); *D04H 3/018* (2013.01); *D04H 13/00* (2013.01); *D06N 3/0002* (2013.01); *E04B 1/8409* (2013.01); *E04B 1/86* (2013.01); *D06N 2211/28* (2013.01); *E04B 1/88* (2013.01); *Y10T 428/239* (2015.01); *Y10T 428/269* (2015.01); *Y10T 442/611* (2015.04)

(58) Field of Classification Search
CPC ........ D01F 6/00; D04H 13/00; C01G 43/003; E04B 1/8409; E04B 1/86
USPC .................... 181/294; 428/76, 219, 339, 397; 442/337; 2/69; 429/249; 210/483; 423/6; 435/398
See application file for complete search history.

(56) References Cited

U.S. PATENT DOCUMENTS

| 2,695,835 A | 11/1954 | Hare |
| 3,853,687 A | 12/1974 | Ishikawa et al. |

(Continued)

FOREIGN PATENT DOCUMENTS

| JP | 56-112535 | 9/1981 |
| JP | 58-098423 | 6/1983 |

(Continued)

OTHER PUBLICATIONS

English patent abstract of JP 05-239709, published Sep. 17, 1993; 9 pgs.

*Primary Examiner* — David Warren
*Assistant Examiner* — Christina Schreiber
(74) *Attorney, Agent, or Firm* — Womble Carlyle Sandridge & Rice, LLP

(57) ABSTRACT

This disclosure relates to articles that comprise polymeric winged fibers. The winged fibers have a high surface area because of their structure, which includes a core surrounded by a plurality of lobes. Channels of one micron or less in width are formed between adjacent lobes to form paths for the capture and/or transport of gases, liquids or particles. The winged fibers are assembled in woven or non-woven fabrics for use in wipes, absorbent pads, composite structures, apparel, outdoor wear, bedding, filtration systems, purification/separation systems, thermal and acoustic insulation, cell scaffolding, and battery membranes.

6 Claims, 3 Drawing Sheets

(51) Int. Cl.
  *A61F 13/15* (2006.01)
  *E04B 1/84* (2006.01)
  *C01G 43/00* (2006.01)
  *E04B 1/86* (2006.01)
  *D01D 5/34* (2006.01)
  *D01F 8/10* (2006.01)
  *D01F 8/12* (2006.01)
  *D01F 8/14* (2006.01)
  *D04H 1/4382* (2012.01)
  *D04H 1/4391* (2012.01)
  *D04H 3/018* (2012.01)
  *D01D 5/253* (2006.01)
  *D06N 3/00* (2006.01)
  *E04B 1/88* (2006.01)

(56) References Cited

U.S. PATENT DOCUMENTS

| | | | | |
|---|---|---|---|---|
| 4,298,649 | A * | 11/1981 | Meitner | D04H 1/565 428/198 |
| 4,519,804 | A | 5/1985 | Kato et al. | |
| 4,741,941 | A * | 5/1988 | Englebert | A47L 13/16 15/209.1 |
| 4,950,531 | A * | 8/1990 | Radwanski | D04H 1/465 428/109 |
| 5,352,518 | A | 10/1994 | Muramoto et al. | |
| 5,611,981 | A | 3/1997 | Phillips et al. | |
| 5,855,798 | A | 1/1999 | Phillips et al. | |
| 5,922,462 | A | 7/1999 | Kent et al. | |
| 5,955,174 | A * | 9/1999 | Wadsworth | B01D 39/1615 428/181 |
| 5,972,505 | A | 10/1999 | Phillips et al. | |
| 6,284,680 | B1 * | 9/2001 | Aikawa | D04H 1/42 442/340 |
| 6,335,092 | B1 * | 1/2002 | Takeda | D01F 8/04 428/359 |
| 6,344,595 | B1 * | 2/2002 | Phillips | A61F 13/531 604/370 |
| 6,450,904 | B1 | 9/2002 | Yeh | |
| 6,706,652 | B2 * | 3/2004 | Groten | D01F 8/12 428/364 |
| 6,753,082 | B1 * | 6/2004 | Lobovsky | A61F 13/53 428/362 |
| 6,761,957 | B1 | 7/2004 | Phillips et al. | |
| 6,811,874 | B2 * | 11/2004 | Tanaka | D01F 8/10 428/370 |
| 6,838,043 | B1 * | 1/2005 | Wagner | A43B 23/07 156/167 |
| 6,855,420 | B2 * | 2/2005 | Johnson | D01D 5/253 428/357 |
| 6,861,142 | B1 | 3/2005 | Wilkie et al. | |
| 7,222,645 | B2 | 5/2007 | Shaffer et al. | |
| 8,093,161 | B2 * | 1/2012 | Bansal | D01F 8/06 442/334 |
| 8,129,019 | B2 * | 3/2012 | Pourdeyhimi | B29C 66/729 428/364 |
| 8,410,006 | B2 * | 4/2013 | Chappas | B29C 66/729 428/364 |
| 2003/0171052 | A1 * | 9/2003 | Bansal | D01F 8/06 442/327 |
| 2004/0045145 | A1 | 3/2004 | Wang et al. | |
| 2005/0176326 | A1 | 8/2005 | Bond et al. | |
| 2006/0057922 | A1 | 3/2006 | Bond et al. | |
| 2006/0135021 | A1 | 6/2006 | Calhoun et al. | |
| 2006/0214323 | A1 * | 9/2006 | Chappas, Jr. | A47L 13/16 264/138 |
| 2006/0223405 | A1 | 10/2006 | Pourdeyhimi et al. | |
| 2006/0292355 | A1 * | 12/2006 | Pourdeyhimi | B32B 7/02 428/212 |
| 2007/0059496 | A1 * | 3/2007 | Russell | A61F 13/5323 428/188 |
| 2008/0003912 | A1 * | 1/2008 | Pourdeyhimi | B32B 7/02 442/340 |
| 2008/0105612 | A1 * | 5/2008 | Chappas | B29C 66/729 210/502.1 |
| 2008/0108265 | A1 * | 5/2008 | Pourdeyhimi | B29C 66/729 442/189 |
| 2008/0167634 | A1 * | 7/2008 | Kouta | A61F 13/53409 604/367 |
| 2012/0148841 | A1 * | 6/2012 | Pourdeyhimi | B29C 66/729 428/373 |
| 2013/0133980 | A1 * | 5/2013 | Pourdeyhimi | D01F 6/00 181/294 |
| 2013/0216829 | A1 * | 8/2013 | Pourdeyhimi | B29C 66/729 428/375 |
| 2013/0232712 | A1 * | 9/2013 | Kawai | A47L 13/16 15/209.1 |
| 2015/0182387 | A1 * | 7/2015 | Ferrer | A61F 13/49007 604/366 |

FOREIGN PATENT DOCUMENTS

| | | |
|---|---|---|
| JP | 2-145825 | 6/1990 |
| JP | 05-239709 | 9/1993 |
| WO | 2004113598 | 12/2004 |

* cited by examiner

ARTICLES CONTAINING WOVEN OR NON-WOVEN ULTRA-HIGH SURFACE AREA MACRO POLYMERIC FIBERS

FIELD OF THE INVENTION

The present invention relates ultra-high surface area macro polymeric fibers and their use in articles of manufacture.

BACKGROUND OF THE INVENTION

Woven and non-woven materials are used in a vast array of applications. Fibers formed into a fabric or substrate can act as filters for air, water, fuel, oil or other liquids. Fabrics have been developed for purification of pharmaceutical media, or to act as chromatography media. Fibers can be combined to function as bandages, tissue scaffolds, or bioreactor scaffolds. Woven and non-woven substrates form cosmetic wipes, hygiene products, and cleaning wipes. Fibers can be combined to provide insulation from heat, cold or sound. Fibers can form a membrane to act as a separator in batteries or fuel cells. Fibers are also used as a substrate to the formation of laminated fabrics such as artificial leather. Fabrics are also well known for use in apparel and can be designed to increase or decrease air flow, manage heat and wick moisture.

There exists room for each of these applications to be improved with a properly selected fiber for use in woven, knitted, braided or non-woven constructions. There exists potential for improvement in absorbency, adherence, filtered particle capture, liquid retention, liquid transfer and hand.

DESCRIPTION OF THE PRESENT INVENTION

The present invention is directed to improved articles of manufacture that include woven, knitted, braided or non-woven web fabrics comprised of macro sized fibers having an increased surface area, to size, ratio. This permits usage of fibers of a more normal cross-section size, used in the industry, to have a substantially increased surface area. Particularly, the present invention is directed to improved articles of manufacture that comprise winged fibers. The winged fibers include a core having multiple lobes extending outwardly from the core to provide a plurality of channels measuring 1 micron or less in width. The lobes provide a significant increase in surface area, at least 2 to 3 times, that of fibers having the same denier.

In one embodiment, the fibers may be used in a wipe (wet or dry), absorbent pad, or pads for applying cosmetics and medical topical treatments. A wipe constructed using the winged fibers described can have excellent absorbency, up to 6 times its own weight.

In a second embodiment, the fibers may be used as a substrate for laminated, composite fabrics such as artificial leather. The use of the macro size fibers (greater than 5 micrometers) provides for a strong substrate, while the increased surface area provides for improved adhesion with the laminate.

In a third embodiment, the fibers may be used in apparel and protective clothing and articles such as masks. The use of macro winged fibers can provide open spaces between the fibers to assist in cooling as compared to micro fibers and can provide improved moisture transfer along the channels of the winged fiber when compared to round fibers. Further, wings can be selectively broken from the fibers to form a densely packed outer surface which is wind resistant.

In a fourth embodiment, the fibers may be used to form acoustic and thermal insulation. Fabrics or other compositions constructed of the disclosed winged fiber have shown an advanced ability to dampen sound, and maintain heat due to the fiber channels and porosity.

In a fifth embodiment, the winged fibers may be used to form a membrane for use as battery separators or in fuel cells. As a battery separator, the life of the battery can be extended by the increased filtering of contaminants and resistant to chemical breakdown.

In a sixth embodiment, the winged fibers may form scaffolding for cell growth. The winged fibers have a large surface area for cell adhesion but the large diameter provides a significant improvement in porosity such that nutrients can reach the growing cells.

In a seventh embodiment, the winged fibers may be combined to form a filtration material. The lobes of the winged fibers are able to act as arms capable to grabbing passing particulates and holding them within the fiber's channels.

In an eighth embodiment, the winged fibers may be used for particle separation and retention, such as the purification of drugs like injectables.

These and other aspects of the present invention will become apparent to those skilled in the art after a reading of the following description of the preferred embodiments, when considered in conjunction with the drawings. It should be understood that both the foregoing general description and the following detailed description are exemplary and explanatory only and are not restrictive of the invention as claimed.

DETAILED DESCRIPTION OF THE DRAWINGS

DETAILED DESCRIPTION OF EXEMPLARY EMBODIMENTS OF THE INVENTION

The Fiber

Figure 1:
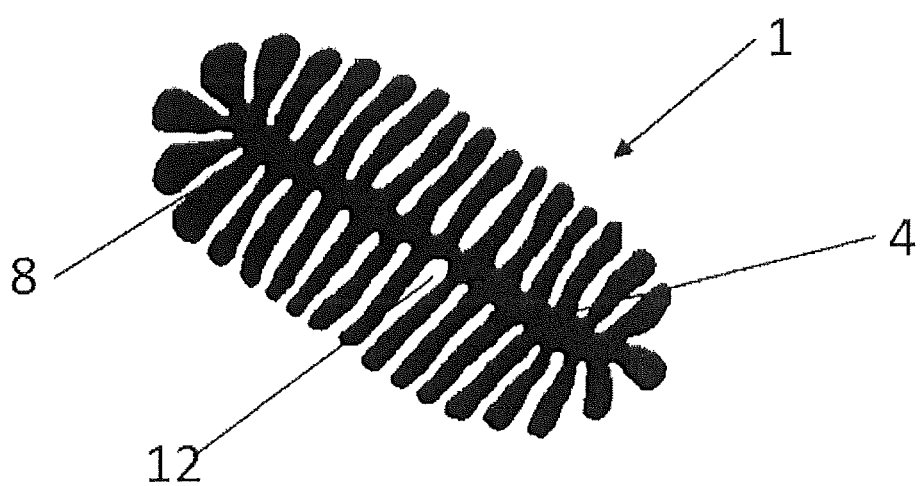
FIG. 1 shows an exemplary cross-sectional view of a winged fiber for use in the articles of this disclosure.

The present invention is directed to improved articles of manufacture, made possible by the use of winged fibers or filaments. As seen in FIG. 1, the winged fiber 1 generally includes a core 4 having multiple lobes or "wings" 8 extending outwardly from the core. A plurality of channels 12 are formed between each respective set of lobes 8. In one exemplary embodiment, the winged fiber 1 is a macro fiber, having a diameter in the realm of 10 microns. A typical cross-sectional dimension is for the winged fiber to have a length of approximately 16.6 µm and a width of approximately 9 µm. This provides a fiber of about 1.5 denier. In cross section, there may be a core of about 16 µm in length with a plurality of wings extending outwardly 3-5 µm on either side thereof. In this exemplary embodiment each of the channels 12 has a width of 1 micron or less, preferably between 0.2 and 1 micron. Such winged fibers 1 have an increased surface area, at least 2 to 3 times the surface area of typically known fibers of the same denier size.

The winged fibers 1 can be formed by co-extruding the end fiber material, a polymer, with a sheath material which maintains the configuration of the channels 12 between lobes 8. The extruded filament is then cut to length to form the fibers. If one tries to spin or extrude a single component fiber, such as 100 percent nylon, in the complex winged shape and with the overall dimensions as described, it will be immediately drawn together in a solid cylinder (i.e. back to a round fiber) before it can solidify. This problem is overcome by co-extruding the desired fiber inside another polymer. The center winged fiber is then called an "island" and the second polymer sheath around the island is called the "sea." After the fiber is fully formed, the sea polymer is washed away to leave the complex shape of the winged fiber.

The following polymers may be utilized to form the core, "island" portion of the winged fiber: polypropylene, polyester terephthalate, poly butyl terephthalate, polyamide, polyvinylidene fluoride, polylactic acid, polyamide 6, polyethylene and combinations thereof. Polymers that may be used as sea polymers include polylactic acid, polyvinyl alcohol, EastOne, which is a polyester from Eastman Chemical, however not yet commercially available, and esPET (an easily soluble polyethylene terephthalate).

In a preferred embodiment, the winged fiber 1 has a middle region surrounded by between sixteen and thirty-two lobes 8. The surface area of the preferred fiber 1 can be between 100,000 $cm^2/g$ and 1,000,000 $cm^2/g$. The channels 12 of the preferred fiber 1, defined between the lobes 8 have a width between about 200 nanometers and about 300 nanometers. Further, the lobes 8 can be uniformly spaced around the middle region.

Additional examples and details of winged fibers appropriate for the articles of the present disclosure are described in U.S. Pat. No. 8,129,019 and U.S. Published Patent Application No. 2008/0105612. These documents are incorporated herein by reference.

Wipes and Liquid Absorbents

One embodiment of the present disclosure is directed to a wipe to be available in a broad range of weights, preferably from 30 $g/m^2$ to 500 $g/m^2$, and more preferably from 100 $g/m^2$ to 500 $g/m^2$, wherein the wipes contain significant capillarity through the use of the winged fibers or filaments 1. As used herein, the term "wipe" includes both wet or dry absorbent pads, as well as pads for applying cosmetic or medical topical treatments. As a result of using these winged fibers, fabrics containing these polymeric fibers in the macro range can be made far more absorbent than fabrics containing other types of macrofibers. Such fabrics become rugged and reusable household and industrial wipes with outstanding water or dust holding capabilities.

In one approach, a nonwoven web is achieved by melt spinning, stretching, and laying down the winged filaments with a titer of 1.0 to 10.0 DTEX. The filaments are immediately entangled by either needle-punching and/or hydro-entangling to form a three-dimensional network. The filaments contain a core that forms the winged structure and a protective sheath that is subsequently washed to "release" the core winged structure. The protective sheath is normally 25 percent or less of the total initial fiber mass. The final fiber will have a dimension not significantly different from the original fiber and will have diameters larger than 10 microns.

A nonwoven web can also include melt spun, stretched, and crimped filaments that are immediately cut into lengths suitable for carding in the range of 30-100 mm. These staple fibers are discontinuous and are fed to a nonwoven card to form the web. For weights greater than 100 g/m2, the webs are also cross-lapped to form a lapped bulkier structure. The final web is then immediately entangled by either needle-punching and/or hydro-entangling to form a three-dimensional network similar to the description above.

The staple discontinuous fibers of the nonwoven web can be mixed or blended or layered with other fibers normally used in wipes, such as rayon, cotton, polyester and the like to form a hybrid structure containing both winged and non-winged fibers. The staple discontinuous fibers can also be mixed or blended or layered with other fibers or winged fiber or non-winged fiber of a different size to form a mixed denier structure. The staple discontinuous winged fibers can further be mixed or blended or layered with other multi-component fibers such as islands in the sea, segmented pie, and the like to form a structure containing splittable fibers or fibers that lend themselves to splitting and/or fibrillating by hydro-entangling. The fiber types, sizes and blend ratios may be determined on a case-by-case basis depending on the intended use.

In a knitted embodiment, the fibers and/or filaments can be formed into yarns that can be used to form the entire structure or loops extending from the structure by a knitting operation.

In a woven embodiment, again the fibers and/or filaments can be formed into yarns that are woven in a plain weave configuration, and the fabric is subsequently washed to release the core winged fiber.

In both the knitted and woven embodiments, the discontinuous staple fibers can be co-mingled with other non-winged fiber types or formed in a core spun yarn containing the winged fibers in the core or the outside layer.

The specific wipe application determines the most suitable type of polymer for forming the winged fiber. For example, for the pickup of oily liquids, a polypropylene wipe may be appropriate. Alternatively, water is better absorbed with a polyethylene terephthalate fiber or nylon fiber. If one is picking up dust, the wipe can be charged, favoring polypropylene with additives. The selection of materials for the wipe can also take into account: strength, durability, feel/softness/hand, and whether the product is to be disposable.

Example 1

A typical filamentary nonwoven wipe is formed by extruding a nylon 6 core, poly-lactic acid sea continuous bicomponent filament forming a winged fiber. The nonwoven is then subjected to hydro-entangling at a pressure of 220 bar on both sides, with at least 5 injectors or manifolds. The fabric is then washed to remove the poly-lactic acid sheath and release the core winged fibers.

Example 2

In a second example, a filamentary nonwoven wipe is manufactured similarly to Example 1, except utilizing a polyester/poly-lactic acid continuous bicomponent filament.

Example 3

In a third example, similarly a filamentary nonwoven wipe is manufactured from a poly-lactic acid/EastOne water dispersible polymer continuous bicomponent filament to form a winged fiber core. The wipe is completed similarly to Examples 1 and 2.

Figure 2:
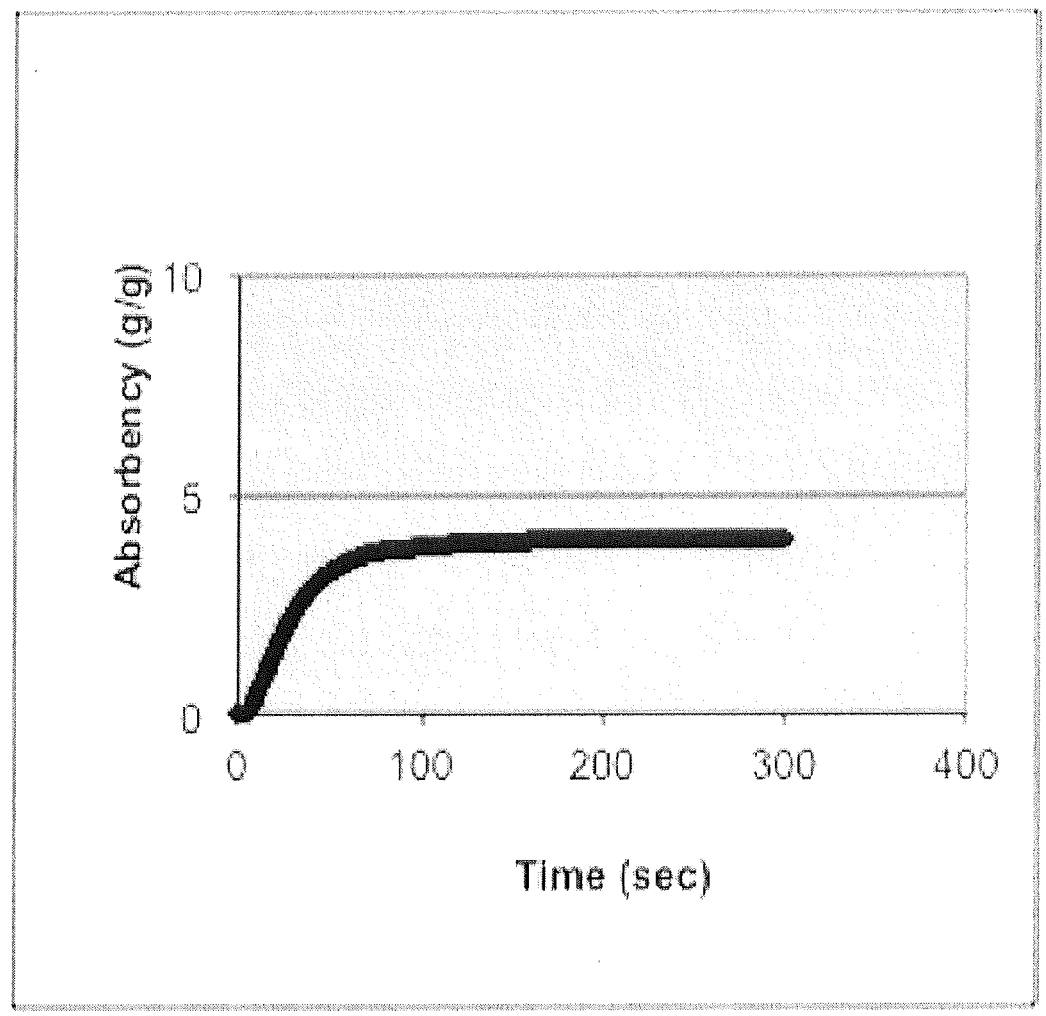
FIG. 2 shows a graph illustrating absorbency of the prior art.
Figure 3:
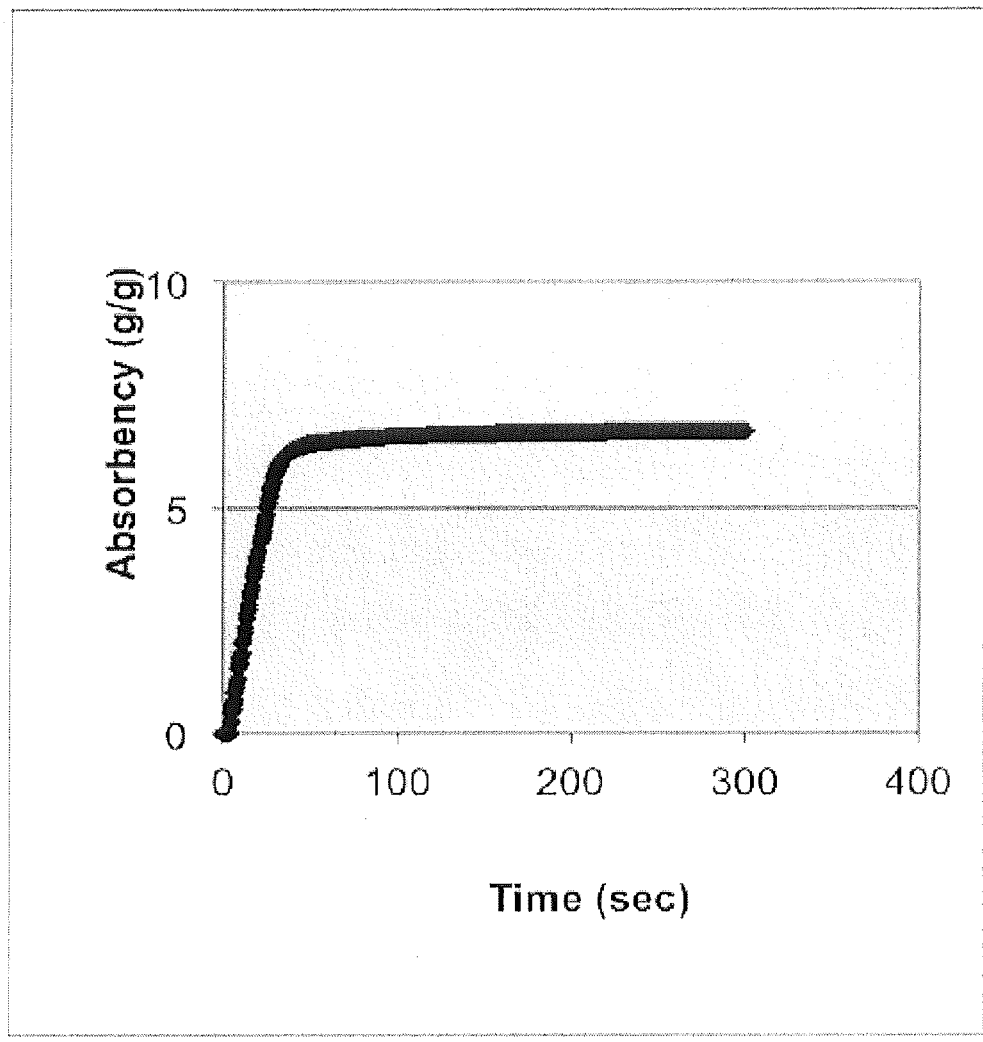
FIG. 3 shows a graph illustrating absorbency of the disclosed wipe.

In a test, a filamentary nonwoven wipe is manufactured according to Example 1. The fabric has a weight of 160 grams per square meter (gsm). 1 inch×6 inch test samples were taken from this fabric and mechanically tested against similar size strips taken from the Evolon® fabric made in accordance with U.S. Pat. No. 6,706,652 for peak load and for strain at break (see Table 1). The weight of the winged fiber test strip was about 1.10 gram and the weight of the Evolon® strip was 1.06 grams. Circular samples with a diameter of 3.5 inches were taken from the same winged fabric and from the Evolon® fabric and tested for absorption. As seen in FIG. 2, it was found that the Evolon® high performance wipe absorbed approximately four times its weight. As seen in FIG. 3, the wipe made from the winged fibers absorbed approximately six times its own weight. Both wipes exhibited durability and flexibility.

TABLE 1

Test Type: Strip Tensile
Sample Size: 1 in × 6 in
ASTM D5035

| Sample ID | Peak Load (lbf) | Strain at Break (%) |
|---|---|---|
| Evolon Wipe MD | Avg. 34.87 | Avg. 35.11 |
|  | Std. Dev. 2.40 | Std. Dev. 3.23 |
| Evolon Wipe CD | Avg. 42.62 | Avg. 45.18 |
|  | Std. Dev. 1.34 | Std. Dev. 1.63 |
| Winged Fiber Wipe MD | Avg. 86.40 | Avg. 55.87 |
|  | Std. Dev. 20.55 | Std. Dev. 12.32 |
| Winged Fiber Wipe CD | Avg. 33.53 | Avg. 117.38 |
|  | Std. Dev. 2.57 | Std. Dev. 6.74 |

The wipe of the present disclosure provides the improved absorbency for a number of reasons. First, the nano-channels formed between lobes act to capture and hold the liquid by a capillary action. Second, the winged fibers of the present disclosure resist meshing or interlocking, which is present in the prior art. Where a core is provided with a limited number of lobes, and large channels, the lobes of one fiber are able to extend into the channels of a second fiber. This interaction reduces the effective channel area used to absorb and hold liquid. Therefore since the lobes of the winged fiber disclosed do not interact with the channels of neighboring fibers, the wipe made from the winged fibers maintains it high level of absorption.

The exceptional absorbency of the winged fiber and of fabrics made from the winged fiber result; make the winged fiber a prime candidate for other applications which require absorbing and holding liquid. These applications include absorbent pads for incontinence products (e.g. bed covers, clothing liners, feminine hygiene, and diapers (both disposable and particularly reusable). Industrial applications might include applications that take advantage of the winged fiber's exceptional wicking characteristics to quickly transport liquids away from cold HVAC ducts, or that use the winged fiber's exceptional absorption characteristics to carry a liquid until it can evaporate from the fabric.

The same channels that make the winged fiber an improved absorbent can also be turned around such that liquid held by the winged fiber can be dispersed. For example, a substrate formed of winged fibers can be immersed in cream, ointment, drugs or antibacterial solutions to form a useful cleaning wet wipe, skincare or cosmetic cream applicator or form part of a wound dressing bandage with medicinal properties. The lobes of the winged fibers increase the flexibility of the fibers, improving the softness of the resulting products and making them suitable for use on sensitive areas such as the face.

Composite Structures

A second embodiment of the present disclosure involves composite structures such as artificial leather formed with a substrate made from winged fibers. Artificial leather fabrics are formed by submerging in, or applying a coating of lamination on a substrate. The ideal substrate would provide qualities of strength, flexibility and adhesion. The substrate needs to be substantially strong to avoid ripping or tearing of the end product. The substrate needs to be flexible to allow for the artificial leather to have excellent hand. The flexibility of the fabric will further allow for use in the manufacturing of a wider variety of products. Adhesion between the substrate and the coating layer is also of critical importance. Without quality adhesion, the substrate is liable to become separated from the coating.

The inventors have discovered that using the macro sized winged fibers disclosed herein provides a fabric substrate which can be coated to produce an improved artificial leather. As compared to prior art artificial leathers, which use micro fibers, the macro winged fibers provide a substrate with increased strength due to the thickness of the fibers. By properly selecting the polymer forming the fiber's core, artificial leather with winged fibers can be created with just as much flexibility as artificial leather made using a microfiber substrate. Further, the increased surface area present in the winged fiber provides superior adhesion for the coating layer when compared to substrates having fibers large or small. The channels of the winged fiber can accept the laminate thereby increasing the adhesion between the coating and the substrate. Additionally, the macro sized winged fibers abate the reduction in surface smoothness caused by the use of traditional round macro fibers. The combination of these features will allow the resulting artificial leather to be capable of reduced thickness, an advantage in apparel applications. Similar applications include creation of water-proof apparel for raincoats or boots, canvas and suede.

An exemplary embodiment of the artificial leather of this disclosure can include winged fibers made from Nylon, though other materials such as PET may be used. The fibers are spun-bound and hydro-entangled to form the substrate for the artificial leather. The substrate can then be coated with a thermally-cured, water-soluble polyurethane resin. Other coatings, including solvent based or UV energy curable resins may also be used. The coatings may be applied by a knife-coater or any commercial coating technique known in the art.

Apparel

The inventors have further discovered that the winged fibers produce improvements when used in apparel applications. The construction of the combined fibers and the combination of the winged fibers with other materials can produce excellent fabric for active apparel, outerwear, or sterile medical products.

The comfort of fabrics that touch the skin is controlled by many factors, including the fabric's ability to transport moisture way from the body, help maintain body temperature and provide wind resistance.

The channels formed as part of the winged fibers can be arranged to provide apparel capable of moisture wicking. Moisture on the skin of the wearer is absorbed by the winged fabric and transferred along the channels between the lobes of the winged fiber away from the skin. When reaching the outer surface of the fabric the moisture can evaporate to the surrounding environment. This channeling of moisture also produces a fabric that can have improved drying time to further increase comfort for the wearer. The macro scale diameter of the winged fiber provides increased strength over micro fiber alternatives. The macro scale winged fibers also produce a more open lattice as compared to micro fiber fabrics. The open lattice allows for increased breathability of the fabric, allowing air to pass through the fabric. This air circulation helps keep the wearer cool.

Alternatively, by treating the winged fiber fabric, the fabric's permeability properties can be altered. In outdoor wear applications, for instance, resistance to the wind is an important feature in keeping the user warm. Fabrics are given a CFM rating (cubic feet per minute per square member) of permeability based upon the amount of air that is capable of passing though the fabric. An exemplary fabric treatment includes hydro-entangling the fibers using water jets. The energy of the jet is specifically selected to break off the outer lobes, and only the outer lobes, from an outer layer of fibers in the fabric. These broken lobes create a barrier layer of flat, linear ribbon shaped fibers on the surface of the fabric. The ribbons of this additional layer will lay flat, providing increased resistance to the transport of air through the fabric because the smaller ribbon fibers form a surface that is much more closely packed than the winged fiber base. This densely packed surface of ribbon fibers can produce a permeability of less than 5 CFM. At this level, the wearer will not feel wind entering through the fabric, but there may still be some air circulation to promote moisture management. As a result the treated winged fiber fabric can provide an apparel material which is highly moisture wicking on the inner surface, while being highly wind resistant at the outer surface. This combination provides optimal user comfort in many activities by balancing thermal warmth with moisture management.

In addition to being wind resistant, the outer ribbon layer will provide a low permeability surface with respect to chemical, biological or nuclear particulate hazards. Further, any particulates that are able to pass through the outer ribbon layer must also pass through the winged fiber layer, where the wings act as filters capturing the particulates within the channels of the of winged fibers. Therefore protecting clothing for healthcare workers, clean room workers, or hazardous material workers can be created that is both highly protective while still providing the temperature and moisture management characteristics of the winged fiber fabric discussed above.

Bedding

The moisture wicking capability of the winged fiber's high surface area and channel forming construction can provide advantages beyond clothing. For example, bedding can also be created from fabrics of winged fibers. As used herein, "bedding" refers to sheets, pillowcases, comforters, quilts, duvet covers and the like. Particularly in hospital settings, moisture management provided by the bedding is critical. First, hospital patients often spend long periods of time restricted to lying in bed. Poor moisture management can lead to bedsores, infection and general discomfort of the patient. Second, sick patients can have their body temperatures change rapidly, resulting in sweat one minute and a feeling of chills the next. Therefore quickly wicking the sweat from the patient, with the help of the winged fiber's channels will help maintain proper body temperature and comfort. Further, if the patient is too warm, the high permeability of the sheet will help keep the patient cool while the sheet can remain in use, either because the patient is asleep, or because the patient prefers the privacy of a cover blanket.

Acoustic and Thermal Insulation

The inventors have further discovered that winged fibers having ultra-high surface area per denier may be used to form an improved acoustic barrier. For acoustic dampening, the winged fibers can be used alone, mixed with other fibers or applied as an additional layer to existing sound dampening products. The winged fiber fabric can be used as a barrier between a source of sounds and the receiver. The winged fiber fabric can also be used to dampen extraneous or rebound noise. For example, a fabric according to this disclosure could be applied to the walls of theaters. The fabric would act to keep out sounds from an adjacent theater while preventing echo of the sounds produced in the target theater. Acoustic fabrics are also often used in automotive applications. These fabrics help maintain the quite interior ride by separating or damping the noise associated with the road.

An exemplary fabric formed of winged fibers will have high air permeability due to the large macro size of the fibers. The winged fibers, designed to prevent meshing among the channels and lobes of adjacent fibers, will also produce a fabric having increased bulk compared to fabrics of similar weight. Lastly, as discussed above the winged fibers provide superior surface area due to the channels formed between the lobes of each fiber. Therefore a fabric formed of winged fibers will have a high ratio of air permeability to solid volume. Additionally, the presence of the channels produces a tortuous path for air attempting to pass through the fabric, with air becoming trapped or at least slowed within the channels. This tortuous path, coupled with the open, yet bulky material provide a combination of features that improve sound damping. These sound damping fabrics can be used in automotive and aeronautic applications as well as in commercial and residential building.

With respect to thermal insulation, winged fibers offer an effective way of trapping air in and around each fiber due to the channels formed around each core. This trapped air provides thermal insulation in much the same way as it provided acoustic damping. The channeled yet high surface area fibers mimic a feather, considered to be nature's most effective insulation system. Furthermore, the winged fiber's large diameter minimizes the chance of poke-through, a common problem in lose fiber thermal insulation products. The winged fibers can be used as the direct replacement of natural feathers (e.g. cold weather garments, bedding products such as comforters and pillows) or in fabric form (woven, knit, and nonwoven) as blankets.

Battery Separators

The inventors have also discovered that winged fibers have useful applications in the battery industry. Batteries are manufactured with permeable membranes disposed between the anode and cathode of the battery. The membrane is critical in preventing an undesired short circuit within the battery, but must be porous enough to facilitate ion transfer between the two electrodes when the battery is in use creating a current. An ideal membrane is chemically stable, strong enough to withstand the pressures within the battery, has a finely tuned thickness, a finely tuned porosity, and the wetability to permanently retain the electrolyte.

A battery separator which optimizes these features will improve the power, life and safety of the battery.

A nonwoven web using winged fibers has shown improvements in battery life when used as a separator. The macro scale fibers provide interfiber spacing which meets the pore dimension requirements for ion transport. The macro scale fibers also provide a material which is sufficiently strong to act as a battery separator without being unnecessarily thick, which can increase the resistance within the battery and therefore decreasing the energy for use outside of the battery.

It is known in the industry that smaller fiber sizes improve performance of battery separators by providing high specific surface area. These smaller, micro, fibers however are susceptible to chemical breakdown during repeated charge and discharge cycles of the battery. The winged fiber provides a similarly high specific surface area while using a larger fiber. For battery separator applications a fiber diameter of 10 microns or more is suggested, preferably 15 microns or more and most preferably, having a diameter of more than 20 microns. The larger fibers also offer more resistance to chemical breakdown than thinner fibers. Even if some of the individual lobes of the winged fiber may become degraded, the winged fibers can maintain the integrity of the separator as a whole. Further, the channels of the winged fiber provide the necessary wetability to retain electrolyte. The channels also provide a home for contaminants that are filtered out of the electrolyte and prevent buildup on the electrodes. As a result of these features found in winged fibers, battery performance can be improved when winged fibers form the separator within the battery.

Cell Scaffolds

A variety of materials and methods have been considered for the creation of cell scaffolds. These structures are typically implanted with cells that use the scaffold to support and influence the growth and multiplication of the cells. Ideal scaffolds provide for cell attachment, allow for cell migration, and retain and transport nutrients. To perform these functions, cell scaffolds should have high porosity, large pores and in many cases should be biodegradable.

The winged fiber's combination of a large diameter with an exceptionally high surface area produces an open, porous, scaffold structure with an improved surface texture for growing cells. The large diameter of the winged fiber combined with its greater fiber stiffness (compared to round fibers of similar surface area) produce scaffolds that have large void regions that improve the growth environment for cells with a concomitant reduction of the necrosis of cells at the interior of the scaffold, something common to scaffolds made from round fibers of a comparable specific surface area. Furthermore, cells growing on the scaffold have excellent adhesion to the fibers, even when experiencing high shear from fluid flow through the scaffold. The large fiber size improves upon the known drawback of previously used textile scaffolds that failed to provide high enough porosity.

Other scaffold applications that can take advantage of winged fibers include scaffolds for growing flat structures such as those used to produce artificial skins and bones, large 3D structures for the growth of artificial organs, and scaffolds for laboratory and industrial bioreactors used to grow a wide range of bio materials.

Filtration

Further, winged fibers can be used to mechanically and/or electro-statically (for air) filter, from air and liquid streams, particulates that range from large molecules to viruses, bacteria, and particulates. Winged fibers, in the form of spun-bond non-wovens can be effective in air and liquid filtration. Additionally, winged fibers in many other forms and product formats are also very effective. Some of these include: (1) columns and beds of staple fibers; (2) fabrics made from staple fibers; (3) short-cut fibers in wet-lay media (both 100% winged fibers and a mix of winged fibers and other fibers such as glass); (4) weaves and knit fabrics (made from continuous multi-filament winged fibers, mixed yarns with winged fibers and other fibers made from cotton, or other types of synthetic fibers); and (5) knits and weaves consisting of some winged fibers and some fibers of other kinds. Winged fibers can produce HEPA air filtration media with 99.97% efficiency with a reduced pressure drop and with improved dust holding capacity (compared to round fibers in a comparable structure). This enables pumps and fans to operate with significant energy savings and extends the time between filter replacements. The result is lower operating costs and reduced workload on the system. In some cases, systems using winged fiber filters can be designed with smaller pumps resulting in the lower construction costs.

Applications that can take advantage of these attributes include home HVAC systems, building HVAC systems, HEPA air filtration systems (hospitals and clean rooms), water filtration (industrial, home, pool, and spa), engine (cabin air, fuel, oil, engine air, and gasoline), and industrial air and liquid process streams (bag air filters and process stream filtration). The lower pressure drop would also provide improved comfort if used as part of a facemask, compared to masks having small diameter melt-blown fibers alone. In addition, the channels of the winged fibers enable the creation of a mask with un-matched dust holding capacity, thus extending the life of the facemask and its cost-of-use.

Material Separation

Besides the filtration of air and liquids, the winged fibers of the present disclosure may be used to separate and capture materials in a number of other fields. For example, the shaped, cross-sectional structures of the winged fiber can create fibers with specific surface areas that are comparable to traditional chromatography beads used for the separation, purification, and filtration of biological and pharmaceutical drugs including injectables. The advantages of the winged fiber over round fibers are; (1) its high surface area (10 to 30 m2/g), in a microfiber diameter (typically 10-30 microns), (2) its strength and rigidity, and (3) its availability in formats that offer separation engineers new options for the design of separation columns. Furthermore, winged fibers are sufficiently inexpensive, compared to traditional chromatography beads, as to be considered disposable after a single use.

This super high surface area of a winged fiber can be treated with molecule-specific functional moieties (attached via any one of a number of techniques including UV/eb/gamma and other radiation and chemical grafting techniques) that can capture, and later release, target bio and pharmaceutical molecules. The macro size of the winged fiber offers additional advantages in the construction of separation columns as they, by their large size and stiffness, are less likely to compress and block the purification column when under the pressure of fluid flow. In addition, unlike beads, the winged fiber can be used in cut fiber or continuous fiber formats to create columns that can be optimized for efficiency, pressure-drop, and column life. Columns built with short staple fibers (winged fibers alone or mixed with other fibers), spun-bond fabrics (layered to optimized the column's performance), and even continuous aligned fibers or yarns (e.g. in the direction of fluid flow) are possible.

The winged fiber can be used to create environmental remediation systems that can mechanically and/or chemically capture toxins and other environmentally dangerous molecules. Specifically, the great surface area of the winged fiber can be coated or modified with other treatments that can capture and bind specific toxic or environmentally hazardous toxins including chemical toxins, heavy metals, bio-toxins, and radioisotopes. This kind of purification system would have particular value when purifying liquids with very low concentrations of contaminants.

The purification of liquids containing target particles and even some very large molecules can be accomplished through simple filtration. However, very small particles and dissolved molecules cannot be filtered for disposal or for purification. However, the techniques discussed above can be used to selectively capture molecules of industrial interest. For example, uranium (in various forms) is dissolved in very low concentrations in the oceans. The winged fiber, if coated with uranium reactive sites could selectively capture uranium for later release and commercial use. This capture of uranium from the oceans would reduce the amount of uranium in the ocean, make available a new source of uranium for commercial use, and replace the large-scale surface-mining techniques current used to mine uranium.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

We claim:

1. A wipe cloth weighing from 100 g/m$^2$ to 500 g/m$^2$, wherein the wipe comprises cross-lapped webs formed at least partially of winged-type polymeric fibers with nano-channels between the wings measuring one micron or less, with a filament titer of 1.0 to 10 dtex, the fibers between about 30 and about 100 mm long,
    wherein the cross-lapped webs are entangled either by needle-punching or hydro-entangling.

2. The wipe cloth according to claim 1, wherein the wing-type fiber comprises a middle region, the middle region having between 16 wings and 32 wings extending therefrom, wherein the wings are projections extending from the middle region and around the periphery of the middle region.

3. The wipe cloth according to claim 1, wherein the cloth is a non-woven.

4. The wipe cloth according to claim 1, wherein the webs include both winged and non-winged fibers.

5. A wipe cloth weighing from 30 g/m$^2$ to 500 g/m$^2$, wherein the wipe comprises at least one spunbond non-woven web formed at least partially of a continuous winged-type polymeric filament with nano-channels between the wings measuring one micron or less, with a filament titer of 1.0 to 10 dtex,
    wherein the web is hydroentangled.

6. The wipe cloth according to claim 5, wherein the at least one web includes both winged-type and non-winged-type fibers.

* * * * *